(12) United States Patent
Hioda et al.

(10) Patent No.: US 10,668,885 B2
(45) Date of Patent: Jun. 2, 2020

(54) SIDE AIRBAG DEVICE FOR REAR SEAT

(71) Applicants: Seiji Hioda, Chiryu (JP); Yoshinori Beppu, Toyota (JP); Atsushi Yamada, Ushiku (JP); Takuya Sudo, Tsukuba (JP)

(72) Inventors: Seiji Hioda, Chiryu (JP); Yoshinori Beppu, Toyota (JP); Atsushi Yamada, Ushiku (JP); Takuya Sudo, Tsukuba (JP)

(73) Assignees: TOYOTA JIDOSHA KABUSHIKI KAISHA, Toyota (JP); AUTOLIV DEVELOPMENT AB, Vargarda (SE)

( * ) Notice: Subject to any disclaimer, the term of this patent is extended or adjusted under 35 U.S.C. 154(b) by 50 days.

(21) Appl. No.: 15/816,502

(22) Filed: Nov. 17, 2017

(65) Prior Publication Data

US 2018/0194318 A1 Jul. 12, 2018

(30) Foreign Application Priority Data

Jan. 10, 2017 (JP) .................................. 2017-002176

(51) Int. Cl.
*B60R 21/21* (2011.01)
*B60R 21/2165* (2011.01)
(Continued)

(52) U.S. Cl.
CPC ............ *B60R 21/21* (2013.01); *B60R 21/215* (2013.01); *B60R 21/2165* (2013.01);
(Continued)

(58) Field of Classification Search
CPC . B60R 21/21; B60R 21/23138; B60R 21/233; B60R 21/2346
See application file for complete search history.

(56) References Cited

U.S. PATENT DOCUMENTS 5,496,061 A * 3/1996 Brown .................. B60R 21/207
280/730.2
5,924,724 A * 7/1999 Nakamura ............ B60R 21/207
280/730.1

(Continued)

FOREIGN PATENT DOCUMENTS

JP H06-286568 A 10/1994
JP 2003-127817 A 5/2003
(Continued)

*Primary Examiner* — Karen Beck
(74) *Attorney, Agent, or Firm* — Oliff PLC

(57) ABSTRACT

A side airbag device for a rear seat relating to the technique of the present disclosure includes: an airbag module that is provided at an interior of a side garnish that is disposed between a vehicle body side portion and a vehicle transverse direction outer side of a seatback of a rear seat; a tubular flow regulating cloth that is provided at an interior of a side airbag of the airbag module, at a periphery of an inflator; and an airbag door that is provided at the side garnish, and that has a hinge portion and a tear portion at a periphery thereof, and that is pushed by the tubular flow regulating cloth when gas is generated from the inflator, wherein the tubular flow regulating cloth has openings at both ends thereof, and has exhaust holes in a peripheral wall thereof.

4 Claims, 5 Drawing Sheets

(51) Int. Cl.
  *B60R 21/239* (2006.01)
  *B60R 21/231* (2011.01)
  *B60R 21/215* (2011.01)
  *B60R 21/00* (2006.01)
  *B60R 21/235* (2006.01)
  *B60R 21/23* (2006.01)
  *B60R 21/233* (2006.01)

(52) U.S. Cl.
  CPC ...... *B60R 21/239* (2013.01); *B60R 21/23184* (2013.01); *B60R 21/23* (2013.01); *B60R 21/233* (2013.01); *B60R 21/23138* (2013.01); *B60R 2021/0032* (2013.01); *B60R 2021/0034* (2013.01); *B60R 2021/21537* (2013.01); *B60R 2021/23538* (2013.01)

(56) References Cited

U.S. PATENT DOCUMENTS

| | | | | |
|---|---|---|---|---|
| 5,951,038 | A * | 9/1999 | Taguchi | B60R 21/2346 280/729 |
| 6,371,513 | B1 * | 4/2002 | Fujimoto | B60R 21/01532 280/730.2 |
| 7,530,595 | B2 | 5/2009 | Naruse et al. | |
| 8,439,395 | B2 * | 5/2013 | Nagai | B60R 21/2346 280/729 |
| 2003/0030258 | A1 * | 2/2003 | Bossenmaier | B60R 21/20 280/730.2 |
| 2006/0006633 | A1 | 1/2006 | Bito | |
| 2006/0061073 | A1 * | 3/2006 | Naruse | B60R 21/21 280/730.2 |
| 2007/0057491 | A1 * | 3/2007 | Bayley | B60R 21/21 280/730.2 |
| 2010/0213692 | A1 * | 8/2010 | Nagai | B60R 21/2346 280/729 |
| 2011/0285119 | A1 | 11/2011 | Yamamoto et al. | |
| 2014/0138939 | A1 * | 5/2014 | Scott | B60R 21/207 280/736 |
| 2015/0014970 | A1 | 1/2015 | Fujiwara | |
| 2016/0096504 | A1 * | 4/2016 | Fujiwara | B60R 21/23138 280/729 |
| 2016/0107604 | A1 | 4/2016 | Fujiwara | |
| 2017/0072900 | A1 * | 3/2017 | Fujiwara | B60R 21/23138 |
| 2019/0077355 | A1 * | 3/2019 | Hioda | B60R 21/207 |
| 2019/0084516 | A1 * | 3/2019 | Fukawatase | B60R 21/207 |
| 2019/0118759 | A1 * | 4/2019 | Kobayashi | B60R 21/23138 |
| 2019/0241146 | A1 * | 8/2019 | Okada | B60R 21/239 |

FOREIGN PATENT DOCUMENTS

| | | | | |
|---|---|---|---|---|
| JP | 2006-021703 | A | | 1/2006 |
| JP | 2006-088774 | A | | 4/2006 |
| JP | 2006-088850 | A | | 4/2006 |
| JP | 2010-184595 | A | | 8/2010 |
| JP | 5126134 | B2 | * | 1/2013 |
| JP | 2016-078768 | A | | 5/2016 |
| JP | 6304021 | B2 | * | 4/2018 |
| JP | 2018171966 | A | * | 11/2018 ....... B60R 21/23138 |
| WO | 2013/114591 | A1 | | 8/2013 |

* cited by examiner

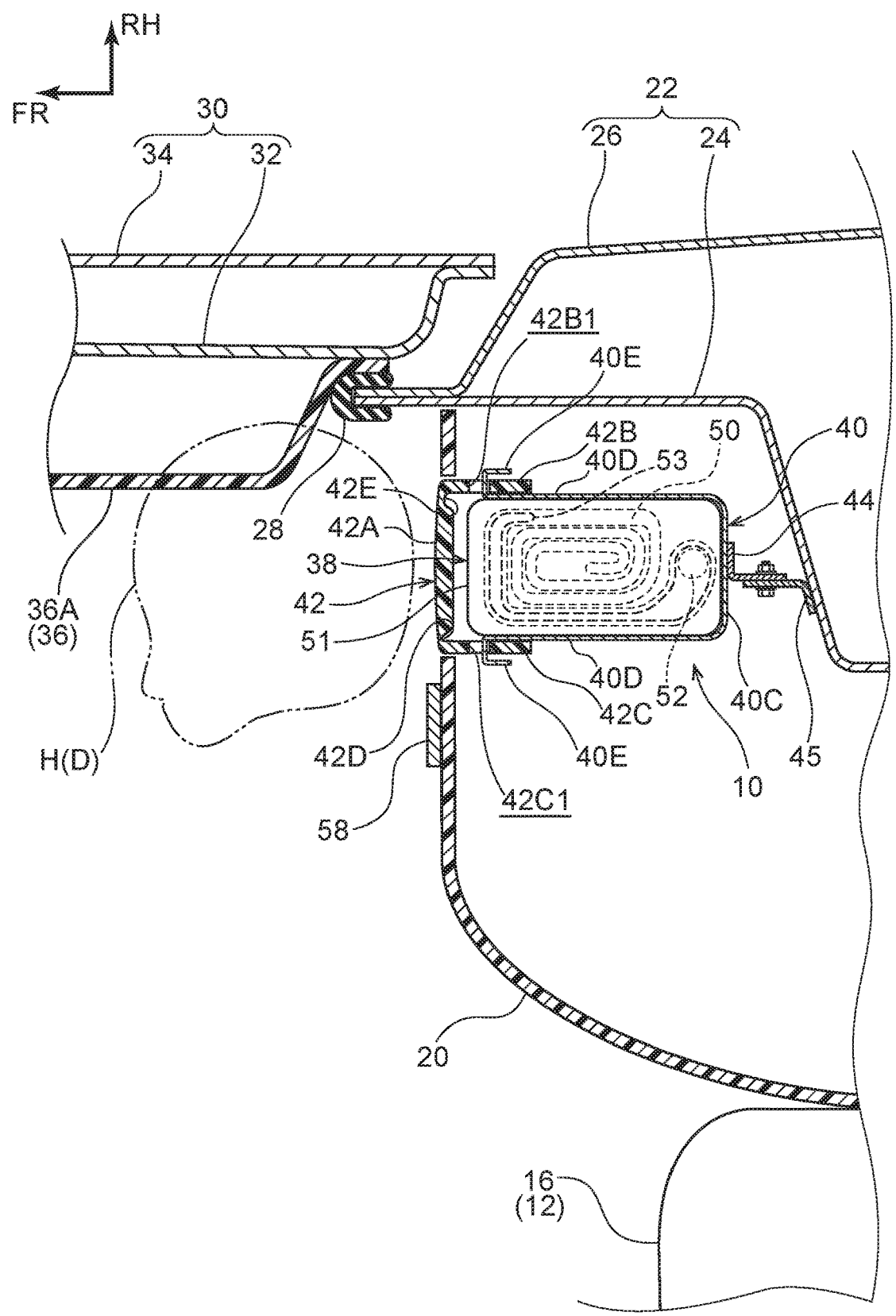

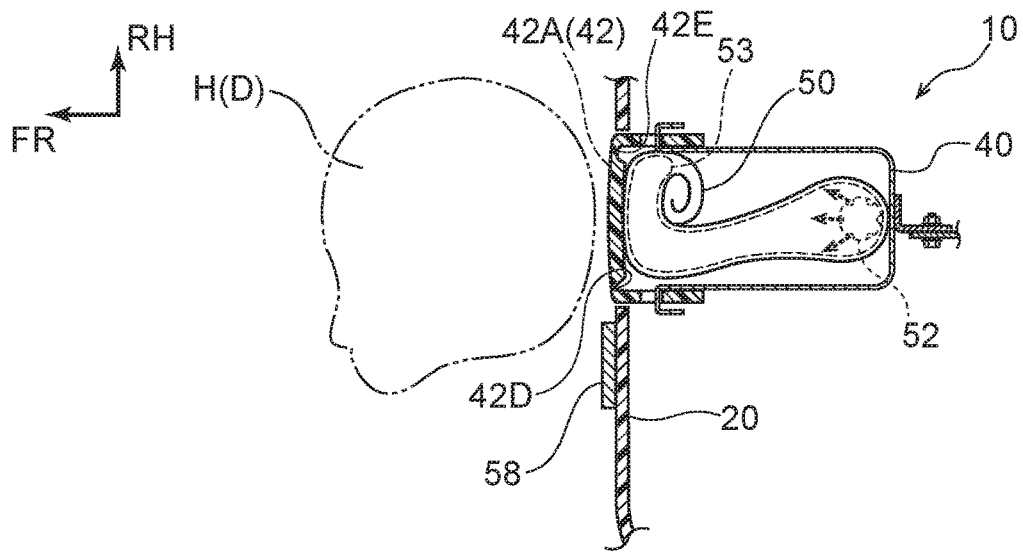
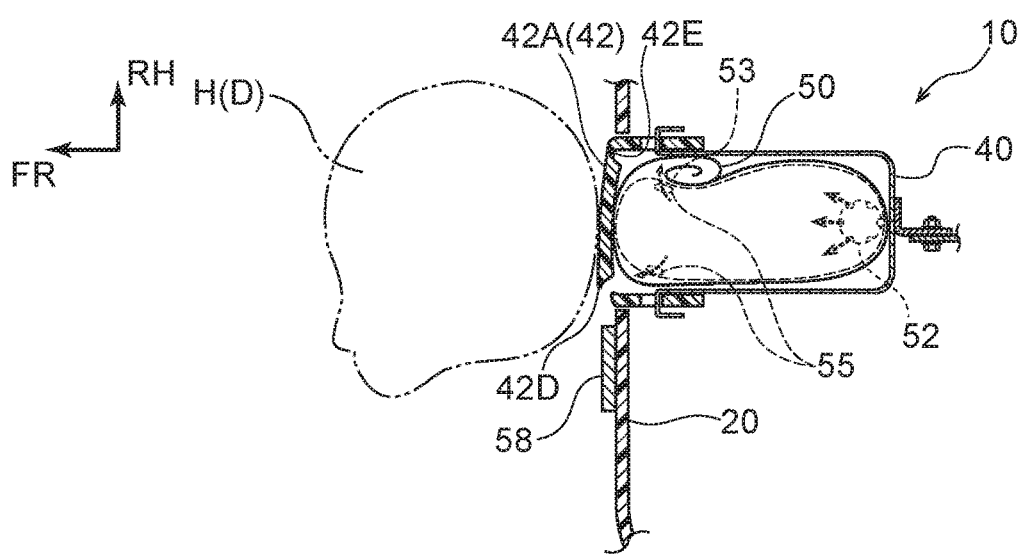
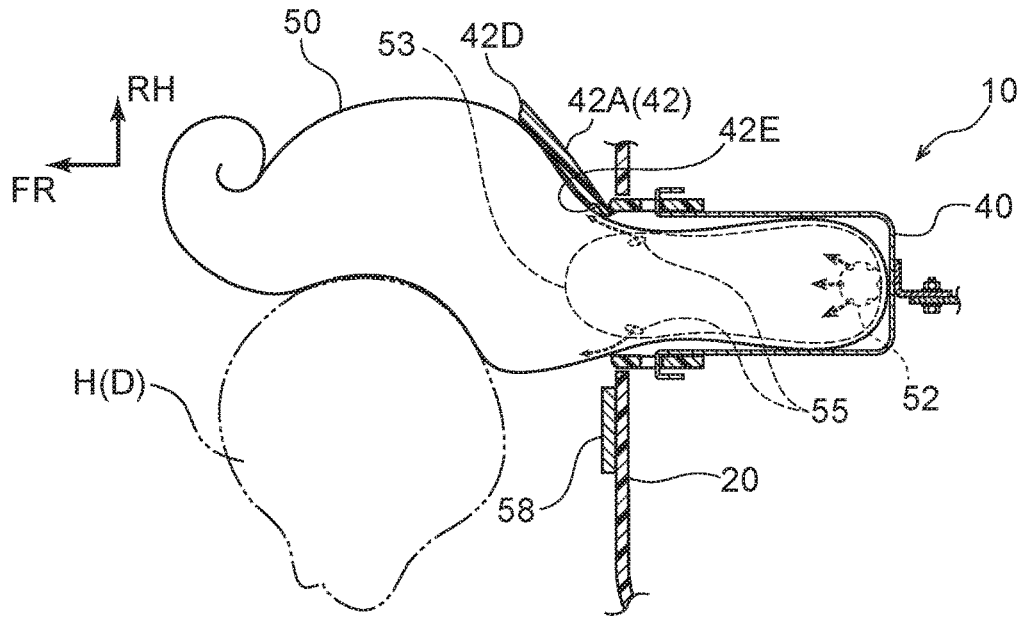

SIDE AIRBAG DEVICE FOR REAR SEAT

CROSS-REFERENCE TO RELATED APPLICATION

This application claims priority under 35 USC 119 from Japanese Patent Application No. 2017-002176, filed Jan. 10, 2017, the disclosure of which is incorporated by reference herein.

BACKGROUND

Technical Field

The technique of the present disclosure relates to a side airbag device for a rear seat.

Related Art

Japanese Patent Application Laid-Open (JP-A) No. 2006-088850 discloses a structure in which a side garnish is provided between a vehicle body and the side portion of a seatback of a rear seat, and a side airbag device is provided at the interior of the cover of the side garnish. This side airbag device has an airbag door that is opened due to a tear portion being broken at the time of inflation and expansion of the side airbag. Further, JP-A No. 2010-184595 discloses a side airbag device that has, at the interior of a side airbag, a tubular flow regulating cloth that distributes gas of an inflator upward and downward.

Here, there has been considered a structure in which, in the side airbag device of Japanese Patent Application Laid-Open (JP-A) No. 2006-088850, in order to break the tear portion and open the airbag door, the tubular flow regulating cloth of JP-A No. 2010-184595 is provided within the side airbag, and is inflated and expanded before the side airbag. In this case, the tubular flow regulating cloth pushes the airbag door before the side airbag. However, in a case in which the vehicle occupant is in an irregular seated position (out-of-position) in which, for example, the vehicle occupant is lying down with his/her head resting on the door armrest, there is the concern that the head of the vehicle occupant will receive excess load from the airbag door at the time of inflation and expansion of the side airbag.

SUMMARY

In view of the above-described circumstances, one embodiment of the present disclosure provides a side airbag device for a rear seat that ensures the expansion performance of an airbag, and that can suppress a vehicle occupant receiving excess load from an airbag door even if the vehicle occupant is out-of-position.

A side airbag device for a rear seat relating to an aspect includes: an airbag module that is provided at an interior of a side garnish that is disposed between a vehicle body side portion and a vehicle transverse direction outer side of a seatback of a rear seat; a tubular flow regulating cloth that is provided at an interior of a side airbag of the airbag module, at a periphery of an inflator; and an airbag door that is provided at the side garnish, and that has a hinge portion and a tear portion at a periphery thereof, and that is pushed by the tubular flow regulating cloth when gas is generated from the inflator, wherein the tubular flow regulating cloth has openings at both ends thereof, and has exhaust holes in a peripheral wall thereof.

BRIEF DESCRIPTION OF THE DRAWINGS

Exemplary embodiments of the present disclosure will be described in detail based on the following figures, wherein:

FIG. 3 is an enlarged sectional view showing, in an enlarged manner, the state cut along line 3-3 of FIG. 1;

FIG. 5A is a plan sectional view that is provided for explanation of operation of the side airbag device for a rear seat relating to the embodiment;

FIG. 5B is a plan sectional view that is provided for explanation of operation of the side airbag device for a rear seat relating to the embodiment; and FIG. 5C is a plan sectional view that is provided for explanation of operation of the side airbag device for a rear seat relating to the embodiment.

DESCRIPTION OF EMBODIMENTS

First Embodiment

A side airbag device for a rear seat relating to a first embodiment is described with reference to FIGS. 1 through 4B. Note that arrow FR that is shown appropriately in these drawings indicates the vehicle forward side, arrow UP indicates the vehicle upward side, and arrow RH indicates the vehicle right side when facing in the advancing direction. Further, in the following explanation, when longitudinal, vertical and left-right directions are used without being specified, they refer to the longitudinal of the vehicle longitudinal direction, the vertical of the vehicle vertical direction, and the left and right when facing in the advancing direction.

Figure 1:
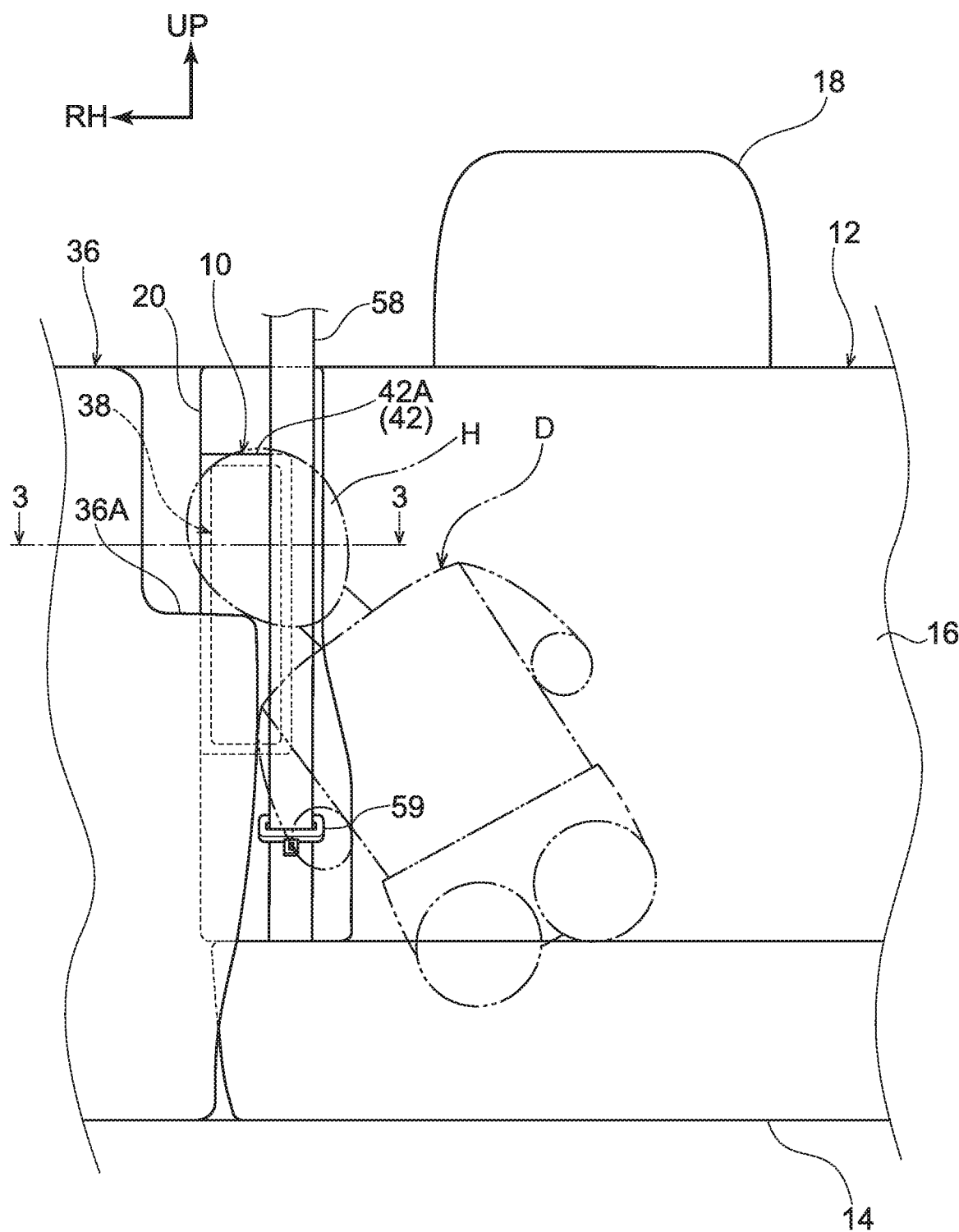
FIG. 1 is a front view showing a rear seat to which a side airbag device for a rear seat relating to an embodiment is applied.
Figure 2:
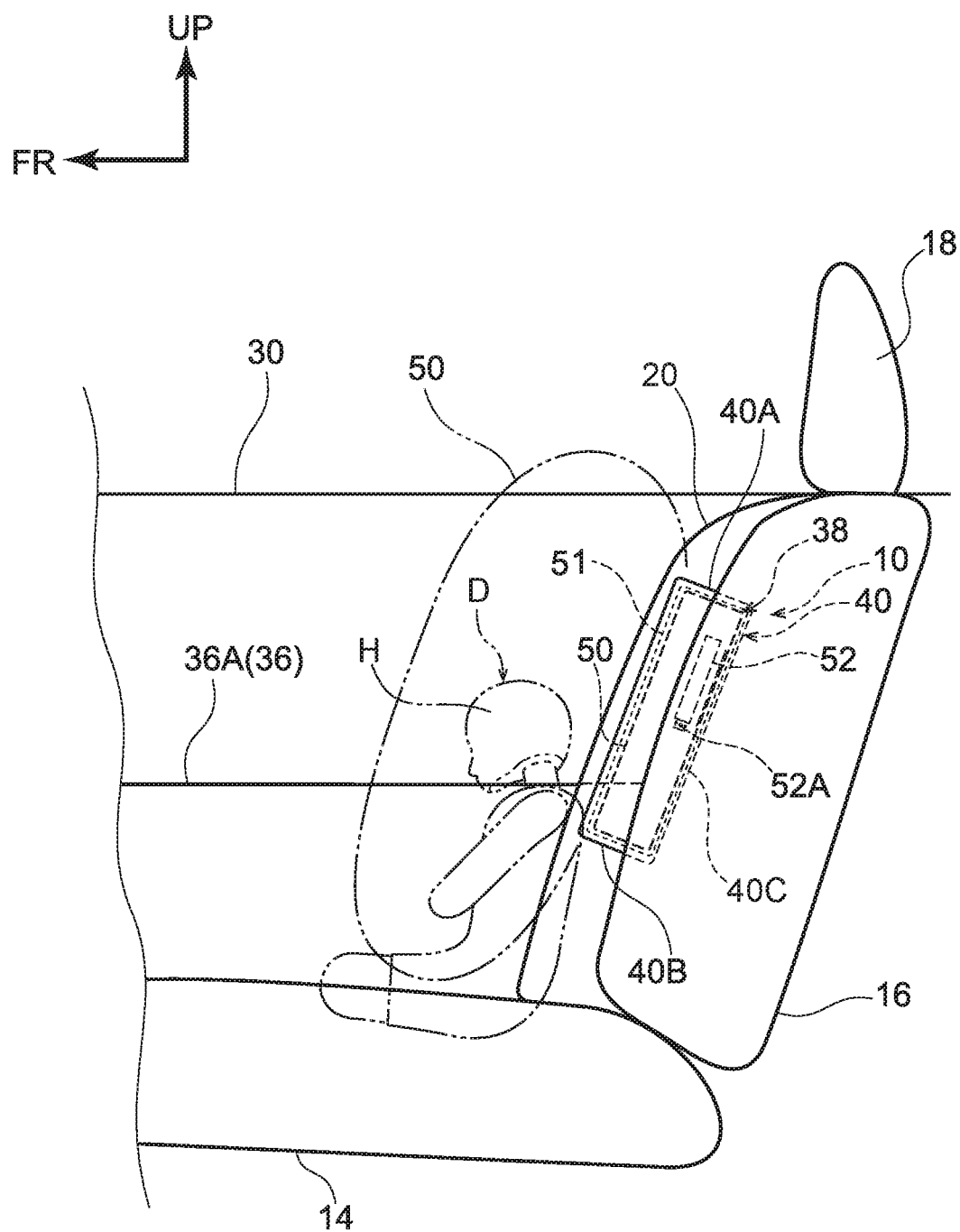
FIG. 2 is a side view of FIG. 1 in which the rear seat, to which the side airbag device for a rear seat relating to the embodiment is applied, is seen from a seat transverse direction inner side.

FIG. 1 is a front view in which a rear seat 12, to which a side airbag device 10 for a rear seat relating to the present embodiment is applied, is seen from the vehicle front side. FIG. 2 is a side view in which the rear seat 12 is seen from the transverse direction inner side. A state in which a crash test dummy (a mannequin) is seated on a seat cushion 14 of the rear seat 12 is shown in FIG. 1. In the present embodiment, the dummy is seated while supposing an irregular seated posture (out-of-position) in which a child is lying down with his head resting on an armrest 36A that is described later. For example, a Hybrid-3 three-year-old child dummy is used as the dummy that is assumed to be a child. Hereinafter, the dummy that is in the irregular seated posture is called "vehicle occupant D" in order to make understanding easy. Further, although not illustrated, an adult dummy that is in a regular seated posture (e.g., a Hybrid-3 AM 50 (50th percentile U.S. adult male) is simply called "vehicle occupant".

As an example, as shown in FIG. 1, the rear seat 12 is structured to include the seat cushion 14 and a seatback 16. A headrest 18 for supporting the head portion of the vehicle occupant is provided at the upper end portion of the seatback 16. Further, a webbing (belt) 58 for restraining the vehicle occupant is disposed at the side of the vehicle occupant. The webbing 58 extends in the vehicle vertical direction, and one end portion of the webbing 58 is fixed to an unillustrated belt anchor that is mounted to the vehicle floor. On the other hand, the other end portion of the webbing 58 is taken-up on an unillustrated retractor that is installed in the upper back panel. Moreover, the webbing 58 is inserted-through a tongue plate 59 that is attached to an unillustrated buckle.

Here, side garnishes 20 are provided at the vehicle transverse direction both sides of the seatback 16 of the rear seat 12. The side airbag devices 10 for a rear seat are assembled in the side garnishes 20. Note that, in the example shown in FIG. 1, only the side garnish 20 and the side airbag device 10 for a rear seat that are at the vehicle transverse direction right side of the seatback 16 are illustrated. However, the side garnish 20 and the side airbag device 10 for a rear seat are similarly provided at the vehicle transverse direction left side of the seatback 16 as well. Further, because the side airbag device 10 for a rear seat that is at the vehicle transverse direction right side and the side airbag device 10 for a rear seat that is at the vehicle transverse direction left side have left-right symmetry, in the following description, only the side airbag device 10 for a rear seat that is at the vehicle transverse direction right side is described.

As an example, as shown in FIG. 3, the side garnish 20 is provided between the seatback 16 and a wheel house 22 that is an example of the vehicle body relating to the technique of the present disclosure, and the side garnish 20 is formed of resin. Further, the side airbag device 10 for a rear seat is assembled in the end portion that is at the vehicle transverse direction right side of the side garnish 20. The side airbag device 10 for a rear seat is described later.

The wheel house 22 is structured to include a wheel house inner panel 24 that structures an inner plate, and a wheel house outer panel 26 that structures an outer plate. Further, the wheel house inner panel 24 and the wheel house outer panel 26 are joined at the front end portions thereof, and this joined portion structures the rear edge of the door opening. Further, a weatherstrip 28 is mounted to the joined portion of the wheel house inner panel 24 and the wheel house outer panel 26.

A rear side door 30 that is an example of a vehicle body side portion relating to the technique of the present disclosure is disposed further toward the vehicle front side than the wheel house 22. The rear side door 30 is structured to include a door inner panel 32 that structures an inner plate, and a door outer panel 34 that structures an outer plate. The door inner panel 32 and the door outer panel 34 are joined at the rear end portions thereof. Further, a door trim 36, which is an interior trim part and is made of resin, is mounted to the vehicle transverse direction left side (the vehicle transverse direction central side) of the door inner panel 32. As an example, as shown in FIG. 1, the armrest 36A which juts-out toward the vehicle transverse direction left side is provided at the door trim 36.

As an example, as shown in FIG. 3, the side airbag device 10 for a rear seat that is assembled in the side garnish 20 is structured to include an airbag module 38, a case 40 and an airbag door garnish 42 (hereinafter appropriately called "airbag door 42"). The airbag module 38 is disposed at the interior of the case 40 that is provided at the side garnish 20, and the opening portion of the case 40 is covered by the airbag door 42.

The airbag module 38 is disposed between the side portion of the seatback 16 and the wheel house 22, and is structured to include a side airbag 50, a diffuser 53 and an inflator 52. Further, as an example, as shown in FIG. 1, at least a portion of the airbag module 38 is disposed at a position that overlaps the armrest 36A as seen in a vehicle front view.

Figure 4A:
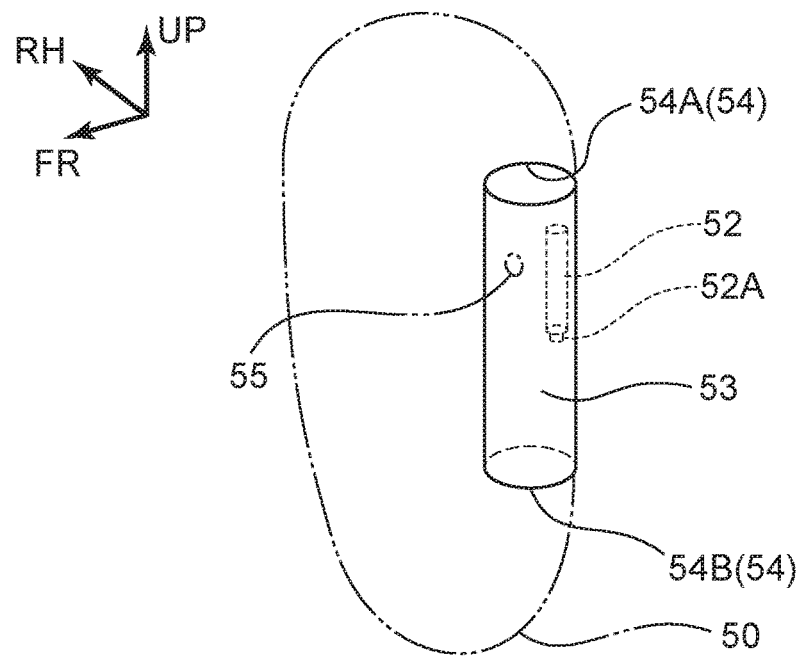
FIG. 4A is a perspective view that is provided for explanation of a diffuser of the side airbag device for a rear seat relating to the embodiment.
Figure 4B:
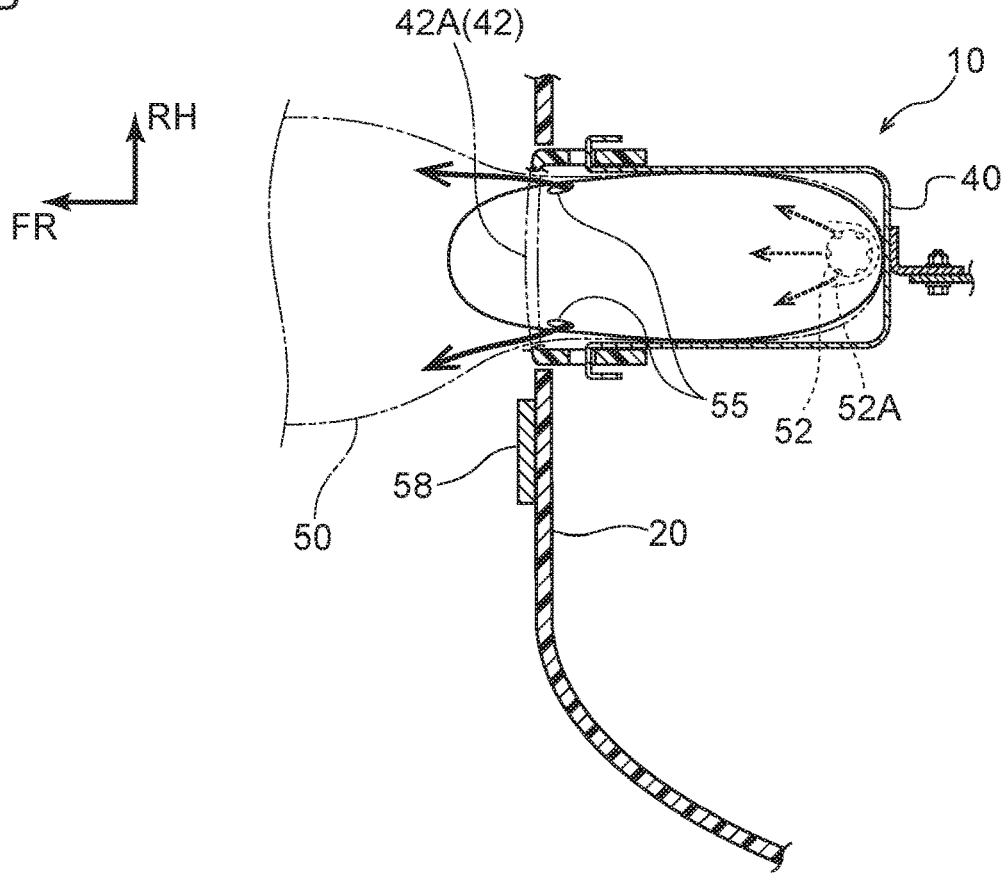
FIG. 4B is a plan sectional view that is provided for explanation of the diffuser of the side airbag device for a rear seat relating to the embodiment.

The side airbag 50 is formed in the shape of a bag, and, at the time of a collision, is expanded at the side of the vehicle occupant and protects the vehicle occupant (see FIG. 2). Here, FIG. 4A and FIG. 4B are drawings showing the state at the time of inflation and expansion of the side airbag 50. Note that, in the example shown in FIG. 4B, the airbag door 42 is omitted for explanation. As an example, as shown in FIG. 4A, the diffuser 53 that is a tubular flow regulating cloth is provided at the interior of the side airbag 50 at the periphery of the inflator 52. As an example, as shown in FIG. 4B, the diffuser 53 is formed to a size that juts-out from the opening portion of the case 40 at the time of inflation and expansion of the side airbag 50. The diffuser 53 that is formed in this way is formed so as to be able to push the airbag door 42 at the time of inflation and expansion. Further, the diffuser 53 has, at the both end portions thereof, an upper opening 54A and a lower opening 54B that serve as openings 54. The diffuser 53 is formed such that gas generated from the inflator 52 is discharged-out into the interior of the side airbag 50 from the upper opening 54A and the lower opening 54B.

The diffuser 53 has a pair of exhaust holes 55 in the peripheral wall. In detail, the exhaust holes 55 are formed so as to be positioned slightly further toward the vehicle upper side than the vertical center of the diffuser 53 when seen in a side view (see FIG. 4A), and so as to be positioned at the interior of the case 40 at the time of inflation and expansion as seen in a plan view (see FIG. 4B). The exhaust holes 55 have the function of discharging gas generated from the inflator 52 to the exterior. At the time of inflation and expansion, i.e., at the time when the airbag door 42 is pushed, the exhaust holes 55 that are formed in this way are not blocked by the airbag door 42, and discharge gas out into the side airbag 50 interior.

Here, as an example, as shown in FIG. 3, the side airbag 50 and the diffuser 53 are, in a state of being folded-up in the form of a roll, enveloped by a wrapping material 51 that breaks easily. Note that the method of folding the side airbag 50 and the diffuser 53 is not particularly limited, and the side airbag 50 and the diffuser 53 may be folded-up in the form of bellows for example.

Together with the side airbag 50 and the diffuser 53, the inflator 52 also is enveloped by the wrapping material 51. A combustion-type inflator or a cold-gas-type inflator is employed as the inflator 52. Due to the inflator 52 being operated, the gas generated thereby is supplied via the diffuser 53 into the side airbag 50 interior. In the present embodiment, the inflator 52 is a cylinder-type inflator, and is disposed such that the length direction thereof is the vehicle vertical direction. Further, as an example, as shown in FIG. 2, plural gas jetting ports 52A are formed in the lower end portion of the inflator 52 along the peripheral surface thereof. Gas is jetted-out from the gas jetting ports 52A due to the inflator 52 being operated.

The inflator 52 is electrically connected to an unillustrated ECU (Electronic Control Unit) that is a control section, and is operated by the ECU at the time of a collision of the vehicle. As an example, as shown in FIG. 2, when the inflator 52 operates, the side airbag 50 is expanded in a range from the seat cushion 14 to the headrest 18. Due thereto, at the time of a side collision of the vehicle, the vehicle occupant, who moves toward the vehicle transverse direction outer side relative to the vehicle body side portion, is protected.

The case 40 that houses the airbag module 38 is formed in the shape of a box whose vehicle front side is open. As an example, as shown in FIG. 2, an upper wall 40A and a lower wall 40B are provided at the upper end portion and the lower end portion of the case 40, respectively. The upper wall 40A is disposed at the vehicle upper side of the airbag module 38 and structures the upper surface of the case 40. The lower wall 40B is disposed at the vehicle lower side of the airbag module 38 and structures the lower surface of the case 40.

A bottom wall 40C, which connects the rear ends of the upper wall 40A and the lower wall 40B, is provided at the vehicle rear side of the airbag module 38 at the case 40. This bottom wall 40C is structured so as to support the side airbag 50, which is in an expanded state, from the vehicle rear side. Further, as an example, as shown in FIG. 3, a pair of side walls 40D extend-out toward the vehicle front side from the vehicle transverse direction both end portions of the bottom wall 40C. The pair of side walls 40D are disposed so as to face one another with an interval therebetween in the vehicle transverse direction. Anchoring claws 40E are formed at the side walls 40D, respectively. The respective anchoring claws 40E extend toward the outer sides from the front end edges of the side walls 40D, and then are bent toward the vehicle rear side. Therefore, the anchoring claws 40E are formed in substantial L-shapes (substantial J-shapes) as seen in a vehicle plan view. The anchoring claws 40E are anchored on the airbag door 42.

Further, an L-shaped bracket 44 is joined to the vehicle rear side surface of the bottom wall 40C of the case 40. On the other hand, an L-shaped bracket 45 is joined to the wheel house inner panel 24 also. The L-shaped bracket 44 at the case 40 side and the L-shaped bracket 45 at the wheel house inner panel 24 side are fastened together via bolts and nuts. Due thereto, the case 40 is fixed to the wheel house 22.

As an example, as shown in FIG. 3, the airbag door 42 is disposed at the vehicle front side of the case 40. The airbag module 38 is covered from the vehicle cabin side by the airbag door 42. Before the side airbag 50 inflates and expands, the airbag door 42 is closed so as to cover the case 40. When the side airbag 50 inflates and expands, the airbag door 42 is opened toward the vehicle front side.

When a cross-section of the airbag door 42 is seen in plan view, the airbag door 42 is structured to include a lateral wall portion 42A that extends in the vehicle transverse direction, and a vertical wall portion 42B and a vertical wall portion 42C that extend toward the vehicle rear side from the lateral wall portion 42A. The lateral wall portion 42A extends in the vehicle transverse direction at the side garnish 20. Further, the lateral wall portion 42A is formed in a substantially rectangular shape whose length direction is the vehicle vertical direction, as seen in a vehicle front view (see FIG. 1). As an example, as shown in FIG. 3, a tear portion 42D that is thin-walled is formed at the end portion of the lateral wall portion 42A, at the root portion of the vertical wall portion 42C. This tear portion 42D is a planned breakage portion that breaks due to the inflation pressure of the side airbag 50 that is described later. A hinge portion 42E that is thin-walled is formed at the end portion of the lateral wall portion 42A, at the root portion of the vertical wall portion 42B. The thickness of this hinge portion 42E is formed to be thicker than that of the tear portion 42D. Further, when the tear portion 42D breaks at the time when the side airbag 50 inflates and expands, the hinge portion 42E becomes a supporting portion, and the portion of the lateral wall portion 42A, which portion is between the tear portion 42D and the hinge portion 42E, opens toward the vehicle front side and the vehicle transverse direction outer side around the hinge portion 42E.

As an example, as shown in FIG. 3, the vertical wall portion 42B and the vertical wall portion 42C are disposed so as to face one another in the vehicle transverse direction. The vertical wall portion 42B extends toward the vehicle rear side from the vehicle transverse direction right side end portion of the lateral wall portion 42A. On the other hand, the vertical wall portion 42C extends toward the vehicle rear side from the vehicle transverse direction left side end portion of the lateral wall portion 42A.

Here, an anchor hole 42B1 is formed in the vertical wall portion 42B. The anchoring claw 40E, which is formed at the side wall 40D of the case 40, is anchored on this anchor hole 42B1. Further, an anchor hole 42C1 is formed in the vertical wall portion 42C. The anchoring claw 40E, which is formed at the side wall 40D of the case 40, is anchored on this anchor hole 42C1.

(Operation and Effects)

Operation and effects of the side airbag device for a rear seat relating to the present embodiment are described next.

Operation of the present embodiment in a case in which the vehicle occupant D is seated in the rear seat 12 and his head portion H is resting on the side garnish 20 is described by using FIG. 5. First, when the vehicle becomes involved in a side collision and the ECU operates the inflator 52, gas is jetted-out into the interior of the diffuser 53 from the gas jetting ports 52A of the inflator 52, and the pressure at the interior of the diffuser 53 rises. Then, the diffuser 53 inflates first from its folded-up state into the form of a tube while the diffuser 53 jets the gas out from the upper opening 54A and the lower opening 54B toward the side airbag 50. At this time, the diffuser 53 fits-tightly to the side airbag 50 and the exhaust holes 55 are in a state of being closed-off, and, as an example, as shown in FIG. 5A, the diffuser 53 inflates together with the side airbag 50.

Next, as an example, as shown in FIG. 5B, when the diffuser 53 whose internal pressure has risen is inflated further and contacts the inner walls (the bottom wall 40C, the side walls 40D) of the case 40 and the lateral wall portion 42A, the tear portion 42D is broken due to the diffuser 53 pushing the lateral wall portion 42A toward the vehicle front side. Due thereto, the airbag door 42 opens toward the vehicle front side and the vehicle transverse direction outer side around the hinge portion 42E. Here, in a case in which the vehicle occupant D who is in an irregular seated posture exists in front of the airbag door 42 that has opened, inflation of the diffuser 53 is suppressed due to the lateral wall portion 42A contacting the head portion H. Then, at the diffuser 53, due to gas being discharged-out from the exhaust holes 55 of the peripheral wall toward the side airbag 50, the internal pressure falls. Namely, in the present embodiment, excess load that is due to the airbag door 42 strongly pushing against the head portion H can be suppressed.

Further, the diffuser 53 whose pressure has decreased and the side airbag 50 are inflated more gently than at the time of breakage of the tear portion 42D, and, due thereto, as an example, as shown in FIG. 5C, the head portion H is moved at a low load, and the airbag door 42 is opened completely. As described above, because the gas that is discharged-out from the exhaust holes 55 flows into the side airbag 50, the expansion performance can be ensured without the inflation and expansion of the side airbag 50 being affected.

As described above, in accordance with the diffuser 53 of the present embodiment, the expansion performance of the airbag is ensured, and the excess load that the vehicle occupant D receives at his/her head portion H can be suppressed. Therefore, the injury value of a head portion that is out-of-position is improved. Note that, by setting the exhaust holes 55 at the height of the head portion H of the vehicle occupant D, the gas generated at the inflator 52 can be discharged efficiently when the lateral wall portion 42A contacts the head portion H. In the present embodiment, a child is supposed as the vehicle occupant D, and similar effects are achieved also in cases of vehicle occupants of small physiques.

Second Embodiment

In a side airbag device 10 for a rear seat of a second embodiment, the exhaust holes 55 of the peripheral wall at the diffuser 53 are closed-off by sewn portions that are formed so as to be able to break at the time when the pressure of the gas of the inflator 52 rises.

The exhaust holes 55 of the present embodiment are closed-off by sewn portions that are formed so as to be able to break. The sewn portions are formed such that, when the internal pressure rises due to gas generated from the inflator 52, the sewn portions break when the internal pressure of the diffuser 53 exceeds a predetermined pressure. Due thereto, even in a case in which the internal pressure of the diffuser 53 rises due to the airbag door 42 contacting the head portion H of the vehicle occupant D, the internal pressure of the diffuser 53 can be lowered reliably, and the vehicle occupant D receiving excess load from the airbag door 42 can be suppressed. Further, in the same way as in the first embodiment, the expansion performance can be ensured in the present embodiment.

A side airbag device for a rear seat relating to a first aspect includes: an airbag module that is provided at an interior of a side garnish that is disposed between a vehicle body side portion and a vehicle transverse direction outer side of a seatback of a rear seat; a tubular flow regulating cloth that is provided at an interior of a side airbag of the airbag module, at a periphery of an inflator; and an airbag door that is provided at the side garnish, and that has a hinge portion and a tear portion at a periphery thereof, and that is pushed by the tubular flow regulating cloth when gas is generated from the inflator, wherein the tubular flow regulating cloth has openings at both ends thereof, and has exhaust holes in a peripheral wall thereof.

In the side airbag device for a rear seat relating to the first aspect, the airbag module is provided at the interior of the side garnish that is at the vehicle transverse direction outer side of the seatback, and the airbag door is provided at the side garnish. Here, when gas is generated from the inflator, the airbag door is pushed by the tubular flow regulating cloth that is provided at the interior of the side airbag at the periphery of the inflator. Further, the tubular flow regulating cloth has openings at both ends thereof, and exhaust holes in the peripheral wall thereof.

In accordance with the side airbag device for a rear seat relating to the first aspect, when gas is generated from the inflator, due to the tubular flow regulating cloth inflating and pushing the airbag door, the tear portion breaks, and the airbag door opens. On the other hand, if there is a vehicle occupant who is out-of-position and lying down with his/her head resting on the door armrest, when the airbag door contacts the head portion of the vehicle occupant, gas is discharged from the exhaust holes that are provided in the peripheral wall of the tubular flow regulating cloth. Due thereto, the internal pressure of the tubular flow regulating cloth decreases, and the gas that is discharged-out from the exhaust holes flows into the side airbag interior. Then, the tubular flow regulating cloth, which is in a state in which the pressure thereof has decreased, and the side airbag move the head portion of the vehicle occupant. Namely, in accordance with this side airbag device for a rear seat, the vehicle occupant receiving excess load from the airbag door can be suppressed. Further, even when gas is discharged-out from the exhaust holes, the discharged gas flows into the side airbag interior, and therefore, the expansion performance of the side airbag is ensured.

In a side airbag device for a rear seat relating to a second aspect, in the structure relating to the first aspect, the exhaust holes are formed so as to not be blocked by the airbag door when the tubular flow regulating cloth pushes the airbag door.

The exhaust holes in the side airbag device for a rear seat relating to the second aspect are formed at positions that are not blocked by the airbag door when the tubular flow regulating cloth inflates and pushes the airbag door. Due thereto, when the airbag door contacts the head portion of the vehicle occupant, the internal pressure of the tubular flow regulating cloth is reliably lowered, and the vehicle occupant receiving excess load from the airbag door can be suppressed.

In a side airbag device for a rear seat relating to a third aspect, in the structure relating to the first aspect or the second aspect, the exhaust holes are closed-off by sewn portions that are formed so as to be able to break when pressure of the gas rises.

The exhaust holes of the side airbag device for a rear seat relating to the third aspect are closed-off by the sewn portions that are formed so as to be able to break. The sewn portions are formed so as to break when the internal pressure rises due to gas generated from the inflator, e.g., when a predetermined pressure is exceeded. Due thereto, also when the airbag door contacts the head portion of the vehicle occupant, the internal pressure of the tubular flow regulating cloth is reliably lowered, and the vehicle occupant receiving excess load from the airbag door can be suppressed.

In accordance with one embodiment of the present disclosure, the expansion performance of an airbag is ensured, and a vehicle occupant receiving excess load from an airbag door can be suppressed even if the vehicle occupant is out-of-position.

All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A side airbag device for a rear seat, comprising:
   an airbag module that is provided at an interior of a side garnish that is disposed between a vehicle body side portion and a vehicle transverse direction outer side of a seatback of a rear seat;
   a tubular flow regulating cloth that is provided at an interior of a side airbag of the airbag module, at a periphery of an inflator, the tubular flow regulating cloth configured to be inflated into the form of a tube when gas is generated from the inflator; and
   an airbag door that is provided at the side garnish, that has a hinge portion and a tear portion at a periphery thereof, and that is pushed by the tubular flow regulating cloth when the tubular flow regulating cloth is inflated into the form of the tube, wherein the tubular flow regulating cloth has openings at both ends thereof and has exhaust holes in a peripheral wall thereof, wherein the exhaust holes are provided in a location that is not blocked by the airbag door when the tubular flow regulating cloth pushes the airbag door, wherein the airbag module is assembled within a case that is provided at the side garnish, the opening portion of the case covered by the airbag door and the tubular flow regulating cloth is formed to a size that juts out from the opening portion of the case at a time of inflation and expansion of the side airbag, wherein, in a plan view of the side airbag device, the exhaust holes are formed at an interior of the case at the time of inflation and expansion of the airbag, wherein the exhaust holes are formed only at a position that is closer to a vehicle upper side than a vertical center of the tubular flow regulating cloth is to the vehicle upper side, and wherein the exhaust holes are formed at positions that are separated from each other in a vehicle transverse direction.

2. The side air bag device for a rear seat of claim 1, wherein the exhaust holes are positioned at a height of a head of a rear seat passenger.

3. The side airbag device for a rear seat of claim 1, wherein the exhaust holes are closed off by sewn portions that are formed so as to be able to break when pressure of the gas rises.

4. The side airbag device for a rear seat of claim 1, wherein:
the airbag module is assembled within a case that is provided at the side garnish, and
in a plan view of the side airbag device, the exhaust holes are formed at an interior of the case at the time of inflation and expansion of the side airbag.

\* \* \* \* \*